(12) United States Patent
Pawlak et al.

(10) Patent No.: US 8,164,061 B2
(45) Date of Patent: Apr. 24, 2012

(54) METHOD AND APPARATUS FOR A UNIVERSAL INFRARED ANALYZER

(75) Inventors: Andrzej M. Pawlak, Rochester Hills, MI (US); Michel F. Sultan, Troy, MI (US)

(73) Assignee: Delphi Technologies, Inc., Troy, MI (US)

(*) Notice: Subject to any disclaimer, the term of this patent is extended or adjusted under 35 U.S.C. 154(b) by 1571 days.

(21) Appl. No.: 11/531,681

(22) Filed: Sep. 13, 2006

(65) Prior Publication Data

US 2011/0139989 A1   Jun. 16, 2011

(51) Int. Cl.
 *G01J 5/02* (2006.01)

(52) U.S. Cl. ............................ 250/339.02; 250/338.1

(58) Field of Classification Search .......... 250/339.02, 250/338.1
See application file for complete search history.

(56) References Cited

U.S. PATENT DOCUMENTS

| | | |
|---|---|---|
| 3,984,190 A | 10/1976 | Barrett et al. |
| 4,195,931 A | 4/1980 | Hara |
| 4,553,816 A | 11/1985 | Durand et al. |
| 4,660,151 A | 4/1987 | Chipman et al. |
| 4,701,838 A | 10/1987 | Swinkels et al. |
| 4,766,551 A | 8/1988 | Begley |
| 4,885,697 A | 12/1989 | Hubner |
| 5,072,338 A | 12/1991 | Hug et al. |
| 5,121,337 A | 6/1992 | Brown |
| 5,121,338 A | 6/1992 | Lodder |
| 5,124,932 A | 6/1992 | Lodder |
| 5,311,445 A | 5/1994 | White |
| 5,324,567 A | 6/1994 | Bratchley et al. |
| 5,357,340 A | 10/1994 | Zochbauer |
| 5,481,476 A | 1/1996 | Windig |
| 5,509,093 A | 4/1996 | Miller et al. |
| 5,563,973 A | 10/1996 | Miller et al. |
| 5,606,164 A | 2/1997 | Price et al. |
| 5,610,836 A | 3/1997 | Alsmeyer et al. |
| 5,710,713 A | 1/1998 | Wright et al. |
| 5,751,415 A | 5/1998 | Smith et al. |
| 5,838,437 A | 11/1998 | Miller et al. |
| 5,892,582 A | 4/1999 | Bao et al. |
| 5,903,659 A * | 5/1999 | Kilgore .................. 382/103 |
| 6,002,476 A | 12/1999 | Treado |

(Continued)

OTHER PUBLICATIONS

Wikipedia, Fabry-Perot interferometer, Wikipedia the free encyclopedia, pp. 1-6 printed from http://en.wikipedia.org/wiki/Fabry-Perot_interferometer (dated Sep. 13, 2006).

*Primary Examiner* — David Porta
*Assistant Examiner* — Christine Sung
(74) *Attorney, Agent, or Firm* — Lawrence D. Hazelton

(57) ABSTRACT

A universal infrared analyzer that includes a tunable optical filter capable of being tuned to one of a selectable set of wavelengths of radiation by a controller accessing a database of a plurality of function specific settings and function specific signatures. The plurality of function specific settings includes settings for al least one of intruder detection, chemical detection, structural integrity detection, medical applications detection, and gas detection. The analyzer also includes a user input interface, for manually selecting one of the function specific settings and one of the function specific signatures. The controller tunes the tunable optical filter to one of the selectable set of wavelengths of radiation based upon the selected one of the function specific settings and a focal plane array generates a signature based upon a target detected by the focal plane array.

22 Claims, 10 Drawing Sheets

U.S. PATENT DOCUMENTS

| | | | |
|---|---|---|---|
| 6,008,888 A | 12/1999 | Nottke et al. | |
| 6,044,189 A | 3/2000 | Miller | |
| 6,115,122 A | 9/2000 | Bao et al. | |
| 6,239,904 B1 | 5/2001 | Serfling et al. | |
| 6,327,036 B1 | 12/2001 | Bao et al. | |
| 6,339,221 B1 | 1/2002 | Schubring et al. | |
| 6,485,981 B1 | 11/2002 | Fernandez | |
| 6,552,321 B1 | 4/2003 | Mills | |
| 6,985,216 B2 | 1/2006 | Treado et al. | |
| 6,985,233 B2 | 1/2006 | Tuschel et al. | |
| 7,235,779 B1 * | 6/2007 | Pinkus et al. | 250/252.1 |
| 7,456,940 B2 * | 11/2008 | Crow et al. | 356/73 |
| 7,928,395 B2 * | 4/2011 | Grimberg | 250/349 |
| 7,999,230 B2 * | 8/2011 | Cole | 250/338.1 |
| 2004/0010444 A1 * | 1/2004 | Delorme et al. | 705/11 |
| 2006/0021498 A1 * | 2/2006 | Moroz et al. | 89/41.06 |
| 2006/0054780 A1 * | 3/2006 | Garrood et al. | 250/208.1 |
| 2009/0096914 A1 * | 4/2009 | Domenicali | 348/345 |
| 2010/0052905 A1 * | 3/2010 | Pelletier | 340/550 |
| 2010/0078564 A1 * | 4/2010 | McAllister et al. | 250/339.07 |
| 2010/0265332 A1 * | 10/2010 | George-Svahn et al. | 348/164 |

* cited by examiner

METHOD AND APPARATUS FOR A UNIVERSAL INFRARED ANALYZER

TECHNICAL FIELD

This present invention relates to a system and method for providing a universal infrared analyzer.

BACKGROUND

Infrared camera systems are currently used for many applications. Most of these applications are military, commercial or medical. Each of these applications for specific applications and/or uses. In addition, each system is highly specialized for one particular application and is not adaptable for varying applications, which may make them more adaptable for consumer applications. For example, consumers may benefit significantly form universal infrared systems if they can be made user-friendly, easy to interpret, adaptable to numerous applications and affordable.

Thus, there is a need for an infrared system that can be adaptable to a variety of end use applications, while also providing an easy to read output. More particularly, there is a need to provide an infrared system that can be adaptable to a variety of end use applications while also providing a convenient human to machine interface.

SUMMARY

In accordance with an exemplary embodiment, a universal infrared analyzer is provided. The universal analyzer is adaptable to many applications and uses wherein the analyzer is capable of detecting a variety of signatures each of which are selectable from a database resident upon a storage medium of the analyzer.

In accordance with one embodiment a universal analyzer is provided, the universal infrared analyzer, comprising: a focal plane array; a tunable optical filter positioned proximate to the focal plane array, wherein the tunable optical filler is capable of being tuned to one of a selectable set of wavelengths of radiation; a controller in operable communication with the focal plane array and the tunable optical filter; a database of a plurality of function specific settings in operable communication with the controller, wherein each of the plurality of function specific settings provides data to the controller to tune the tunable optical filter to one of the selectable sets of wavelengths; a database of a plurality of function specific signatures in operable communication with the controller; a user input interface, for selecting one of the plurality of function specific settings and one of the plurality of function specific signatures, wherein the controller tunes the tunable optical filter to one of the selectable set of wavelengths of radiation based upon the selected one of the function specific setting and the focal plane array generates a signature based upon a target detected by the focal plane array; a correlator for comparing the signature to the selected one of the plurality of function specific signatures, wherein the selected function specific signatures corresponds to the selected function specific setting and the correlator is in operable communication with the focal plane array and the database of the plurality of function specific signatures, wherein the correlator provides an output indicating whether the signature corresponds to the selected one of the plurality of function specific signatures; and wherein the universal infrared analyzer does not provide a source of illumination to the target.

In another exemplary embodiment, a universal analyzer is provided, the universal infrared analyzer, comprising: a focal plane array; a tunable optical filter positioned proximate to the focal plane array, wherein the tunable optical filter is capable of being tuned to one of a selectable set of wavelengths of radiation, the selectable set of wavelengths of radiation being in a range defined by 0.3-16 µm; a controller in operable communication with the focal plane array and the tunable optical filter; a database of a plurality of function specific settings in operable communication with the controller, wherein each of the plurality of function specific settings provides data to the controller to tune the tunable optical filter to one of the selectable sets of wavelengths; a database of a plurality of function specific signatures in operable communication with the controller; a user input interface, for selecting one of the plurality of function specific settings and one of the plurality of function specific signatures, wherein the controller tunes the tunable optical filter in one of the selectable set of wavelengths of radiation based upon the selected one of the function specific settings and the focal plane array generates a signature based upon a target detected by the focal plane array; and a correlator for comparing the signature to the selected one of the plurality of function specific signatures, wherein the correlator provides an output indicating whether the signature corresponds to the selected one of the plurality of function specific signatures.

In another exemplary embodiment, a method for detecting a desired signature with a universal infrared analyzer is provided. The method comprising: providing a database of a plurality of function specific settings, each of the plurality of function specific settings defining a setting of a tunable optical filter being proximate to a focal plane array of the universal infrared analyzer, the setting of the tunable optical fiber corresponding to one of a selectable set of wavelengths of radiation, the selectable set of wavelengths of radiation being found in a range defined by 0.3-16 µm; providing a database of a plurality function specific signatures, each of the plurality of function specific signatures corresponding to a signature generated detected by the focal plane array when a particular scene has been exposed to the focal plane array; selecting one of the plurality of function specific settings; tuning the tunable optical filter to the selected one of the plurality of function specific settings; selecting one of the plurality of function specific signatures; exposing the focal plane array to a scene wherein radiation is passed through the tunable optical filter to the focal plane array; generating a signature from the focal plane array, the signature corresponding to radiation detected from the scene, the radiation being one of a selectable set of wavelengths of radiation corresponding to the selected one of the plurality of function specific settings; comparing the generated signature to the selected one of the plurality function specific signatures; and indicating whether the generated signature is similar to the selected one of the plurality function specific signatures.

DESCRIPTION OF EXEMPLARY EMBODIMENTS

Figure 1:
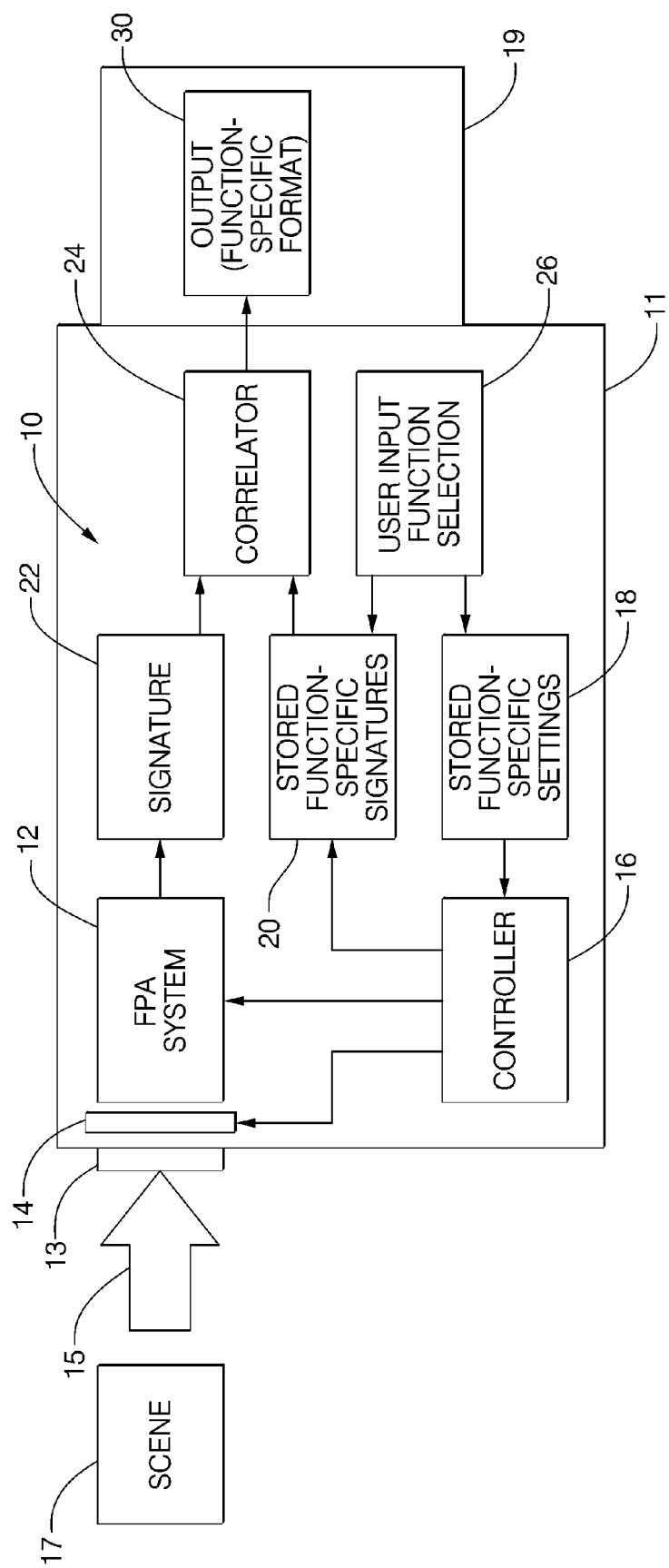
FIG. 1 is a schematic illustration of an exemplary embodiment of the present invention.

Exemplary embodiments of the present invention are directed to methods and apparatus for providing a system and/or universal infrared analyzer. The method and apparatus are configured to permit flexible usage of a single focal plane array (FPA) or a plurality of focal plane arrays, thereby enabling many functions or functionalities of the detector or focal plane array thereby allowing the analyzer to be used in numerous applications. In accordance with an exemplary embodiment the focal plane array and associated filter is capable of being set to a function specific setting where in function specific signatures corresponding to the function specific setting are searched for and detected signatures or images are compared to function specific signatures or images stored in a database resident upon the analyzer.

In accordance with an exemplary embodiment of the present invention the universal analyzer is able to be configured to detect radiation in the visible and non-visible spectrum as well as function specific signatures identifiable through infrared radiation. In addition, the universal analyzer will have a database of function specific signatures being searched for thus providing a means for on site comparison via the universal analyzer. In one alternative exemplary embodiment, the universal analyzer is provided with a means for saving detected signatures thus creating a database of specific or unique signatures that can be used as function specific signatures for comparison in later applications.

The universal infrared analyzer hardware includes a tunable optical filter that is configured to be positioned in front or the focal plane array so as to transmit a selectable set of wavelengths over a wide frequency range. In an exemplary embodiment, the wavelengths include both the visible and the non-visible spectrum. In other words, the tunable optical filter provides a means for selecting various ranges in response to a user or operator provided input, in accordance with an exemplary embodiment of the present invention, the tunable filter and focal plane array are provided in a hand held system wherein the system is adaptable to search for function specific signatures selected by a user. In an exemplary embodiment, the filter is tunable to allow specific wavelengths or radiation from a sample, specimen, target or scene to be transmitted to the focal plane array while filtering out other non-desirable wavelengths or radiation. In an exemplary embodiment, the system is controlled according to a plurality of various stored function-specific settings, which in turn are selected by the user thus providing a wide range of uses. The wavelength-dependent signal detected by the focal plane array is then correlated with stored function specific signatures that are specific to that particular application.

In accordance with an exemplary embodiment of the present invention, the universal infrared analyzer may include any one of the following nom-limiting examples: medical diagnostics; hazardous gas detection; enhanced vision including night vision; human and animal infection, and wound detection; specific material detection; temperature detection; and intrusion detection, which in itself can include many subsets (e.g., human or animal movement, non-biological movement (i.e., signatures of moving vehicles), structure integrity detection, etc). Moreover, and in an exemplary embodiment, a single universal analyzer is configured to be used in each of the aforementioned examples thus, the analyzer becomes truly universal.

The analyzer is equipped with an adaptable tuning capability to change from one function to another function, as well as the ability to enhance its sensitivity and contrast through an adaptive tuning mechanism. In accordance with an exemplary embodiment, the tuning mechanism comprises a tunable optical fiber.

The proposed system architecture includes the following features: ability for the user to select a function from a menu of applications, automatic selection of the appropriate wavelength range, reference wavelengths, and signatures related to that particular function; auto scan over a wide wavelength range (e.g. 0.3-16 µm or 1-15 µm and in one embodiment 3-12 µm); and the automatic ability to compare the captured focal plane array image to stored signatures related to the desired function.

The proposed system takes advantage of the unique features of a new class of low cost focal plane arrays such as those that are based on ferroelectric materials. Non limiting examples of such focal plane arrays include those illustrated in U.S. patent application Ser. No. 11/319,033 filed Dec. 27, 2005; Ser. No. 11/353,501 filed Feb. 14, 2006; and Ser. No. 11/353,355, filed Feb. 14, 2006, the contents each of which are incorporated herein by reference thereto. Together with the tunable filter, these focal plane arrays can be adapted to a variety of applications that require intelligent electronic control of each pixel, including the ability of electronic tuning pixel-by-pixel with an active filtering mechanism. This would enable for the real-time reconfiguration of the array to provide spectral tuning, scene sampling, and spatial resolution. This intelligent focal plane array control is an enabler to meet particular applications needs and requirements of different signal parameters and proper conditioning of these parameters.

The filter/focal plane array system is controlled according to stored application-specific settings, the application in turn being selected by the user. The wavelength-dependent signal of the application specific setting is detected by the focal plane array and is then correlated with stored signatures that are specific to that particular application.

Referring now to FIG. 1, a schematic illustration of a universal infrared analyzer 10 according to an exemplary embodiment of the present invention is illustrated. Universal infrared analyzer 10 comprises a focal plane array or system 12. Although shown schematically, the universal infrared analyzer comprises a housing 11 having an inlet opening 13 for receipt of radiation 15 from a scene 17 being viewed as well as a graphical display 19 and means for selecting and inputting commands or data to the universal infrared analyzer. In addition, the universal analyzer of an exemplary embodiment of the present invention operates in a passive mode thus, no illumination of the scene is provided by the universal analyzer. In other words, the universal analyzer is configured to operate from the radiation generated by the scene or target being viewed by the focal plane array of the universal analyzer thus, the universal analyzer does not provide a source of illumination to the target. It is, of coarse, contemplated that other exemplary embodiments of the present invention may operate in an active mode wherein the universal analyzer provides a source of illumination to the target.

In accordance with an exemplary embodiment, the housing of the universal infrared analyzer is configured to be easily grasped and used by an individual (e.g., hand-held device). In one embodiment, the device will have a portable power supply such as a battery. Of course, the universal analyzer may have any configuration and those shown in the attached drawings are merely provided as examples.

The pixels or elements of the focal plane array are positioned behind a tunable optical filter 14, wherein the tunable optical filter is capable of being tuned to one of a selectable set of wavelengths of radiation over a large range of frequencies.

Figure 6:
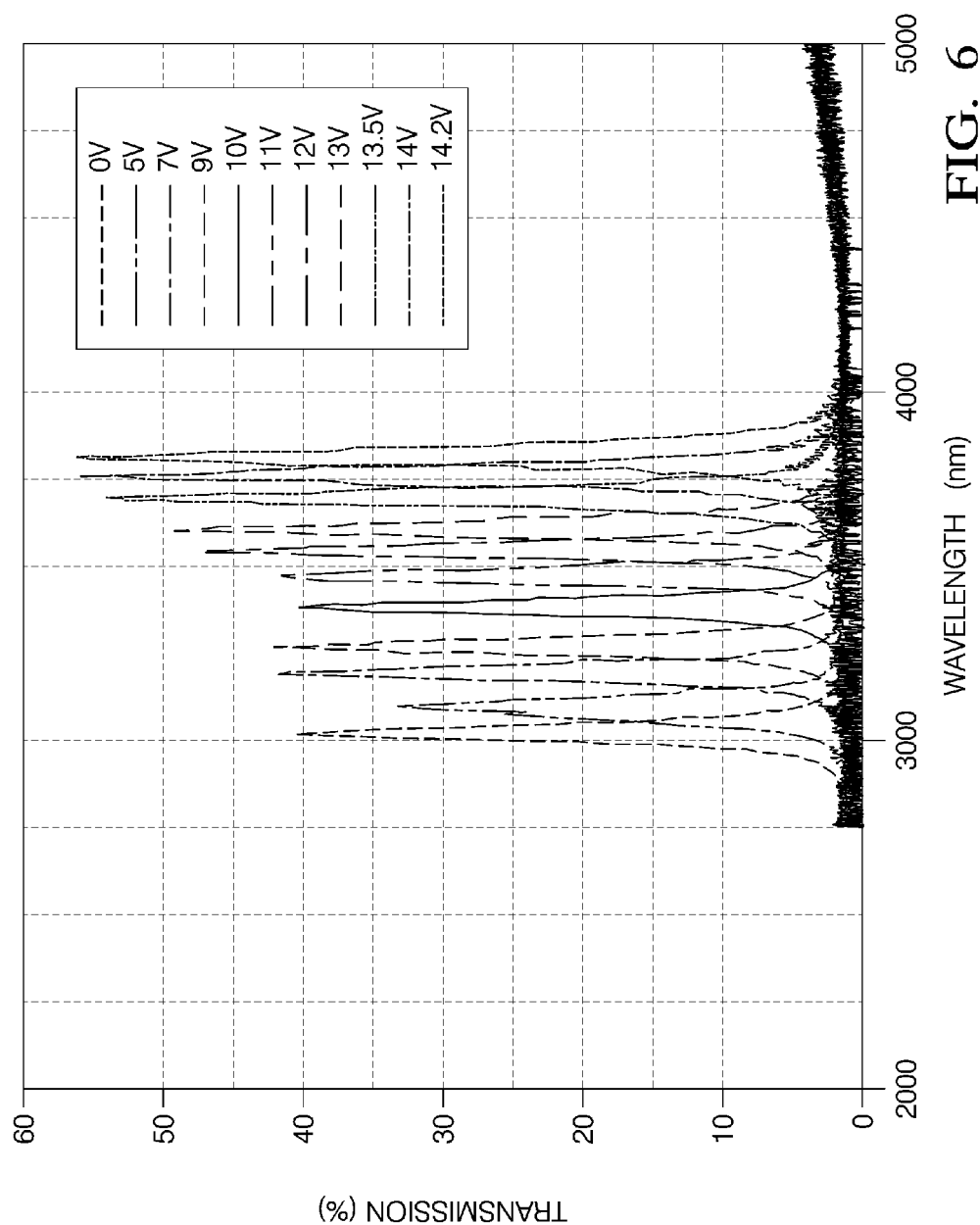
FIG. 6 is a graph illustrating transmission percentages of a tunable filter employed with an exemplary embodiment of the present invention.

In accordance with one exemplary embodiment the tunable optical filter is a Fabry-Perot Interferometer, wherein tuning of the tunable optical filter is performed by methodologies and techniques used in Fabry-Perot Interferometers, which are know to those skilled in the related arts. Further details on the operation of a Fabry-Perot Interferometer are in found the document entitled Fabry-Perot Interferometer, which can be found at the following link: http://en.wikipedia.org/wiki/Fabry-Perot_Interferometer and a copy of which is found in the attached information disclosure citation, the contents of which are incorporated herein by reference thereto. Of course, the Fabry-Perot Interferometer is but one non-limiting example of such a tunable filter. FIG. 6 illustrates different transmission percentages provided at different wavelengths corresponding to various driving voltages of a tunable Fabry-Perot Interferometer.

For example, the graph of FIG. 6 illustrates transmission percentages based upon driving voltages using a Fabry-Perot Interferometric filter. Accordingly, and as a user provides a function selection, stored function specific settings are provided to tune the tunable filter by for example, providing a voltage from a voltage source to tune the optical filter. In addition, the universal analyzer of an exemplary embodiment of the present invention operates in a passive mode thus, no illumination of the scene is provided by the universal analyzer.

The universal infrared analyzer also comprises a controller 16. Controller 16 is in operable communication with the focal place array and the tunable optical filter. The controller will comprise a microcontroller, microprocessor, or other equivalent processing device capable of executing commands of computer readable data or program for executing a control algorithm. In order to perform the prescribed functions and desired processing, as well as the computations therefore (e.g., the timing, reading and comparing of specific signatures, the control processes prescribed herein, and the like), the controller may include, but not be limited to, a processor (s), computer(s), memory storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. As described above, exemplary embodiments of the present invention can be implemented through computer-implemented processes and apparatuses for practicing those processes.

In accordance with an exemplary embodiment, the controller in FIG. 1 may be integrated or stand alone, and would provide the input to the tunable filter and the focal plane array depending on the application selected by the user.

The universal infrared analyzer also comprises a database of a plurality of function specific settings 18 and a database of a plurality function specific signatures 20, the database of function specific settings and the database of the function specific signatures are each in operable communication with the controller, wherein selected settings cause the filter to be tuned to allow specific wavelengths of radiation to pass through the tunable filter to the focal plane array wherein the selected wavelengths cause the focal plane array to generate a signature and the signature is compared to those stored in database 20. Alternatively, the function specific settings are sent directly from the database to the filter to cause the filter to be tuned to allow the specific wavelengths of radiation to pass through the tunable filter to the focal plane array wherein the selected wavelengths cause the focal plane array to generate a signature and the signature is compared to those stored in database.

Accordingly, the universal analyzer of exemplary embodiments of the present invention is adaptable to be tuned to a specific range of wavelengths and provide signatures corresponding to the specific range of wavelengths wherein the signatures are compared to signatures stored in a database resident upon the universal analyzer. In accordance with exemplary embodiment, the tunable optical filter and a focal plane array are capable of selecting and receiving radiation in wide wavelength range (e.g. 0.3-16 μm).

In one alternative exemplary embodiment, a function selection corresponding to a user input will cause a function specific setting to be directly applied to the tunable filter for selection of the desired radiation to be passed through to the focal plane array.

In operation, the analyzer will have the tunable optical filter set to allow specific wavelengths of radiation through the optical filter. Thereafter, the analyzer will be positioned to detect radiation from a specific source and radiation of specific wavelengths are passed through to the focal plane array wherein a plurality of pixels or sensing elements will generate a signature, image or detected signature or image (represented schematically by box 22 in FIG. 1).

Thereafter, detected signature or detected image 22 is presented to a correlator 24, wherein correlator 24 also receives one of the stored function specific signatures from database 20. The received function specific signature will correspond to a user specific setting and frequency the filter is tuned to. Then the correlator or comparator 24 will compare the detected signature to the received function specific signature in order to determine whether there is a match. As used herein "match" is intended to cover a predetermined range that will correspond to positive match output being generated. In other words, and in accordance with an exemplary embodiment, the detected signature and received function specific signature need not be exact matches although alternative exemplary embodiments may be configured to only provide positive outputs if an exact match is found.

In order to determine the setting of the tunable optical filter and which specific signature to look for, a user input interface 26 is provided to select the settings of the universal analyzer. In accordance with an exemplary embodiment, user input interface 26 may comprise any suitable device for inputting the function settings of the universal analyzer. Non-limiting examples include, keyboards, liquid crystal displays, touch screens, mouse etc. wherein a graphical user interface is provided to provide commands to controller 16 and present feedback (e.g., visual, haptic (vibration) or audio) to the user.

In accordance with an exemplary embodiment, a function specific setting is provided via the user input interface, wherein the tunable filter is tuned to only allow a specific range of radiation to pass through to the focal plane array. The array will then provide a signal or detected signature indicative of the target and/or scene being viewed and thereafter the correlator or comparator will compare the detected signal or signature to one provided by database 20, which is also selected by the user at the user input interface.

In other words, a user selects a function for the universal analyzer via a user input and based upon the selected function at least one of a plurality of function specific settings is used to tune the tunable filter to a desires range of wavelengths (corresponding to the function specific setting) and at least one of a plurality of stored function specific signatures is selected for comparison to the detected signature.

In accordance with an exemplary embodiment, correlator 24 will comprise a means for comparing the selected function specific signature to one detected by the focal plane array. Non-limiting examples of means for comparing include comparators, analog to digital converters and other logic devices for taking the received or detected signature and comparing it to a target or function specific signature wherein an output 30 will be provided. In accordance with an exemplary embodiment, output 30 will be an affirmative or negative indication of the presence of a function specific signature. Thus, fee analyzer will have the ability to compare a captured thermal image to stored function specific signatures related to desired or selected function.

In one non-limiting exemplary embodiment the focal plane array or system comprises a plurality of pyroelectric sensors. Of course, other types of sensors are also contemplated to be within the scope of exemplary embodiments of the present invention. Each of the pyroelectric sensors in the focal plane array when exposed to infrared light generates a signal indicative of a temperature of a portion of an image scene that is detected by the pyroelectric sensors. The array will further comprise an electric circuit that is provided to switch the pyroelectric sensors between first and second polarization states such that the circuit generates a differential signal indicative of a temperature of the sensors. In accordance with an exemplary embodiment, the pyroelectric sensors are constructed from a ferroelectric material strontium bismuth tantalate (SBT) (SrBi2Ta209). However, in alternate embodiments other ferroelectric materials or the like can be utilized for the pyroelectric sensors.

The electric circuit is provided to switch the pyroelectric sensors between first and second polarization states such that the electric circuit generates a differential signal indicative of a temperature of the sensor. The electric circuit may include a voltage source, the pyroelectric sensors, a plurality of diodes, an operational amplifier, and a capacitor.

The signal captured by the focal plane array positioned behind the tunable filter may be post-processed to enhance the signal-to-noise ratio and to reduce the amount of raw data send to digital processor.

Figure 2:
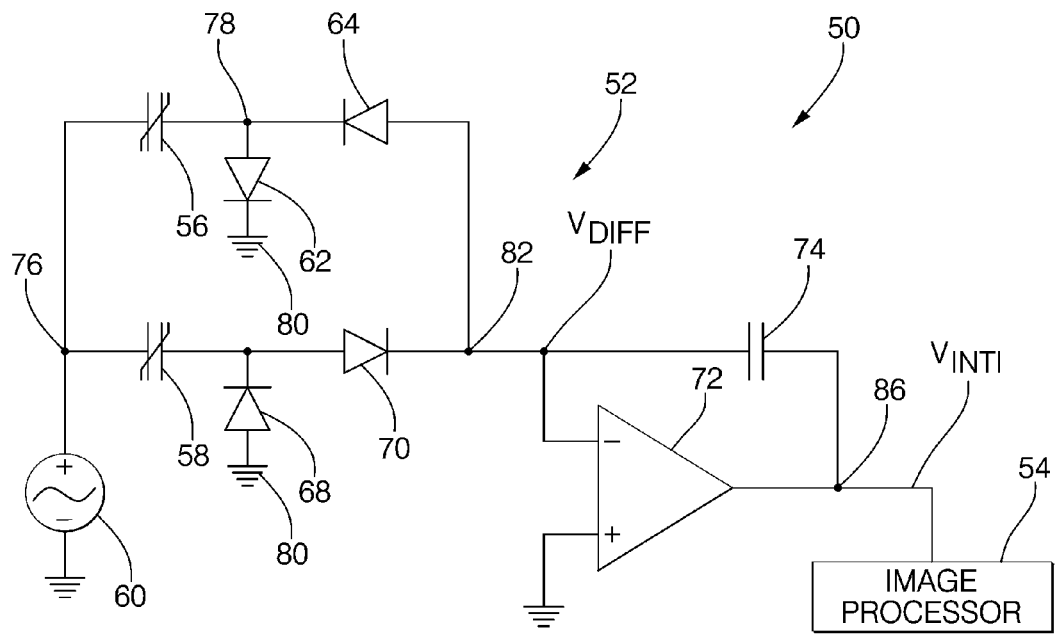
FIG. 2 is a schematic illustration of a system for controlling a focal plane array.

Referring now to FIGS. 2-5, a non-limiting example of a focal plane array contemplated for use in exemplary embodiments of the present invention is illustrated. Here, a system 50 for controlling pyroelectric sensors in the focal plane array is illustrated. The system 50 includes an electrical circuit 52, a focal plane array 12, and an image processor 54. The focal plane array comprises a plurality of pyroelectric sensors 56. Although only one sensor 56 is shown in FIG. 1, a plurality of sensors 56 comprising a focal plane array may be provided in accordance with exemplary embodiments of the present invention (FIG. 2). Each of the pyroelectric sensors in the focal plane array 12 exposed to infrared light and/or visible light generates a signal indicative of a temperature of a portion of an image scene that is detected by the pyroelectric sensors.

The electric circuit is provided to switch the pyroelectric sensor 56 and another pyroelectric sensor 58 between first and second polarization states such that the circuit generates a differential signal indicative of a temperature of sensor 56. Referring to FIG. 2, the electric circuit includes a voltage source 60, the pyroelectric sensors 56, 58, diodes 62, 64, 68, 70, an operational amplifier 72, and a capacitor 74. The voltage source is electrically coupled to the pyroelectric sensors at a node 76. Pyroelectric sensor 56 is also electrically coupled to node 78. Diode 62 has an anode electrically coupled to the node 78 and a cathode electrically coupled to a system ground 80. The diode 64 has an anode electrically coupled to a node 82 and a cathode electrically coupled to the node 78. Further, the pyroelectric sensor 58 is electrically coupled to the node 84. Further, the diode 68 has a cathode electrically coupled to the node 84 and an anode electrically coupled to the system ground 80. The diode 70 has an anode electrically coupled to the node 84 and a cathode electrically coupled to the node 82. Still further, the operational amplifier 72 includes a non-inverting terminal, an inverting terminal, and an output terminal. The non-inverting terminal of the operational amplifier is electrically coupled to the system ground. The inverting terminal of the operational amplifier is electrically coupled to the node 82. The capacitor 74 is electrically coupled between the nodes 82 and 86 and the node 86 is further electrically coupled to the output terminal of the operational amplifier. Finally, the node 86 is electrically coupled to the image processor 54.

Figure 4:
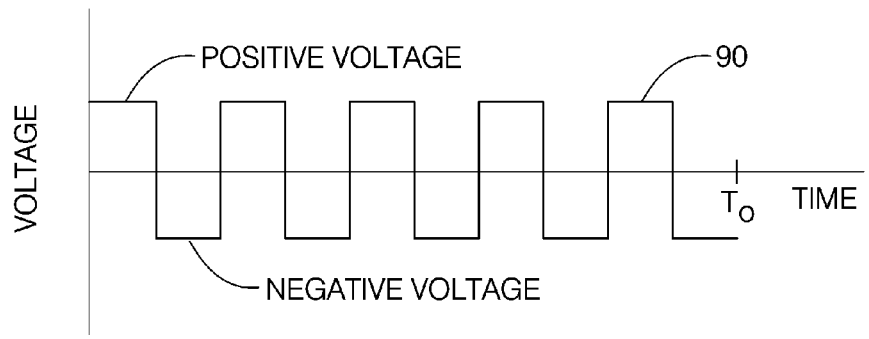
FIG. 4 is a schematic of an oscillatory voltage waveform utilised in the system of FIG. 2.

Referring now to FIGS. 2 and 4, the voltage source is provided to generate an oscillatory voltage waveform 90, also known as a switching voltage waveform, that is transmitted to the pyroelectric electric sensors 56 and 58. The oscillatory voltage waveform 90 comprises a pulse-width modulated voltage waveform. It should be noted, however, that in an alternative embodiment, the oscillatory voltage waveform can comprise any oscillating voltage waveform, known to those skilled in the art. For example, the oscillatory voltage waveform can comprise an AC voltage waveform, a triangular-shaped voltage waveform, and a sawtooth-shaped voltage waveform. When the waveform 90 has a positive voltage, the polarization states of the pyroelectric sensors 56 and 58 are switched toward a first polarization state and when the waveform 90 has a negative voltage, the polarization is switched toward a second polarization state.

The pyroelectric sensors 56 and 58 of the focal plane array are provided to generate output voltages that will be utilized by the circuit 52 to generate output signal ($V_{Int1}$) indicating an average temperature of the pyroelectric sensor 56. The pyroelectric sensor 56 is exposed to infrared radiation from a portion of physical environment. The pyroelectric sensor 58 is not exposed to any incoming infrared radiation, and generates a reference charge $Q_{Reference1}$. When a temperature of the pyroelectric sensor 56 is greater than a temperature of the sensor 58, the polarization of the pyroelectric sensor 56 is less than a polarization of the pyroelectric sensor 58. Further, an amount of electrical charge generated by the pyroelectric sensor 56 is less than an amount of electrical charge generated by the pyroelectric sensor 58. Alternatively, when a temperature of the pyroelectric sensor 56 is less than a temperature of the sensor 58, the polarization of the pyroelectric sensor 56 is greater than a polarization of the pyroelectric sensor 58. Further, an amount of electrical charge generated by the pyroelectric sensor 56 is less than an amount of electrical charge generated by the pyroelectric sensor 58.

Figure 5:
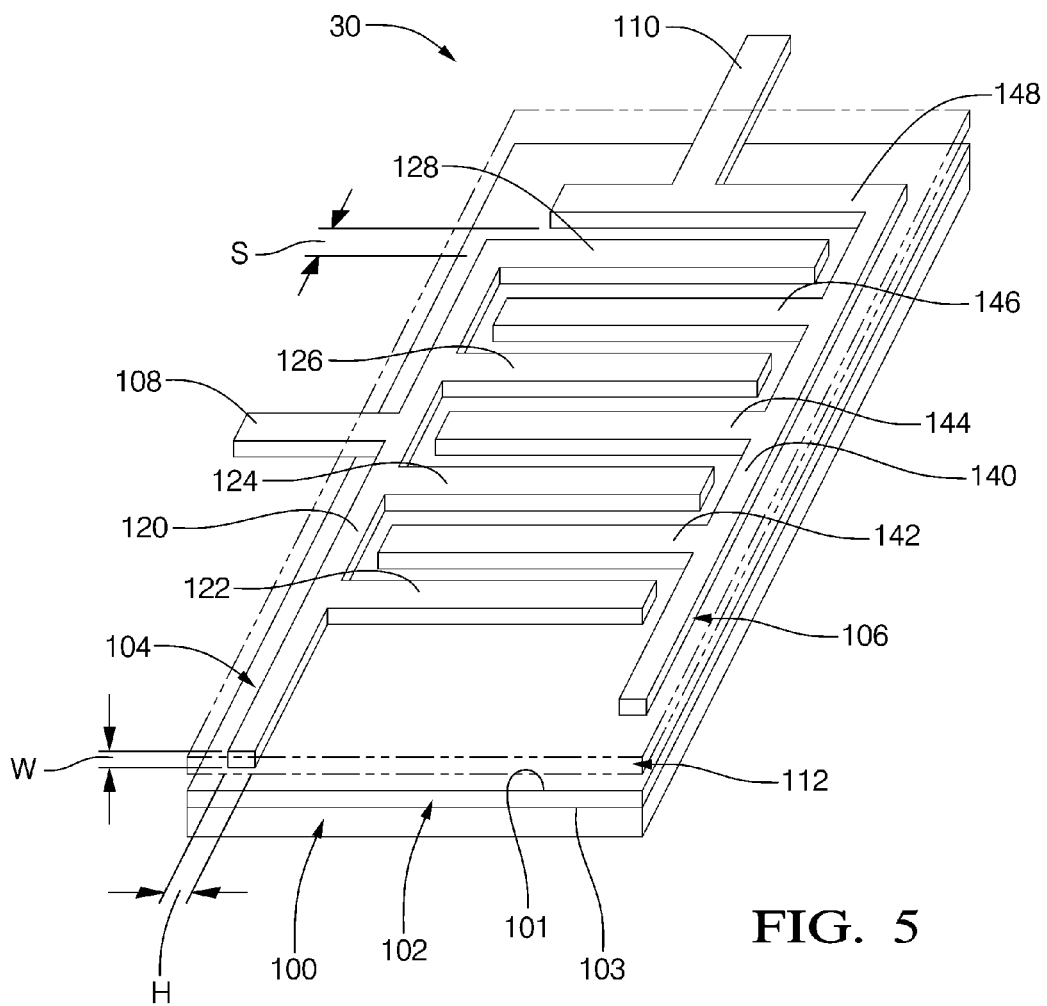
FIG. 5 is a schematic of a pyroelectric sensor that is utilised in the focal plane array of FIG. 3.

Referring to FIG. 5, a structure of the pyroelectric sensor 56 will now be explained. It should be noted that the structure of the pyroelectric sensor 58 has a substantially similar structure as the pyroelectric sensor 56. Accordingly, only the structure of the pyroelectric sensor 56 will be explained in detail. The pyroelectric sensor 56 includes an insulation layer 100, a ferroelectric layer 102, electrodes 104, 106, electrical terminals 108, 110, and a heat absorbing layer 112 tuned to the waveband of the radiation of interest (e.g., light to be detected).

The insulation layer 100 is provided to insulate the remaining components of the pyroelectric sensor 56. The insulation layer 100 comprises a substantially planar insulation layer constructed from silicon dioxide.

The ferroelectric layer 102 is constructed from a ferroelectric material strontium bismuth tantalate (SBT) (SrBi2Ta209). However, in alternative embodiments other ferroelectric materials or the like can be utilized for the ferroelectric layer 102. The ferroelectric layer 102 includes a side 101 and a side 103 opposite the side 101. The ferroelectric layer 102 is disposed on side 103 to the insulation layer 102.

The electrodes 104 and 106 are disposed on the side 101 of the ferroelectric layer 102. The electrodes 104 and 106 are spaced apart from one another and are provided to form a plurality of dipole moments therebetween when a switching voltage is applied between the electrodes 104 end 106. The electrodes 104 and 106 are constructed from a metal, such as copper, aluminum, titanium, platinum, or alloys thereof for example.

The electrode 104 includes a base portion 120 and extension portions 122, 124, 126, and 128. The extension portions 122, 124, 126, and 128 extend from the base portion 120 generally perpendicular to the base portion 120. Each of the extension portions 122, 124, 126, and 128 are disposed substantially parallel to one another.

The electrode 106 includes a base portion 140 and extension portions 142, 144, 146 and 148. The extension portions 142, 144, 146 and 148 extend from the base portion 140 generally perpendicular to the base portion 140 toward the base portion 120. Each of the extension portions 142, 144, 146 and 148 are disposed substantially parallel to one another. The extension portion 142 is disposed in a region between the extension portions 122 and 124. The extension portion 144 is disposed in a region between the extension portions 124 and 126. Further, the extension portion of 146 is disposed in a region between the extension portions 126 and 128. Still further, the extension portion 128 is disposed in a region between the extension portions 146 and 148.

When a switching voltage is applied between the electrodes 104 and 106, a first electric field, (not shown) travels through the ferroelectric layer 102 between adjacent extension portions of the electrodes 104 and 106. Further, a second electric field, which is a parasitic by-product field, travels between the spacing (S) between adjacent extension portions of the electrodes 104 and 106. An electrical current that flows between the electrodes 104 and 106 is indicative of a temperature level of the ferroelectric layer 102, which is further indicative of a portion of the scene of the environment being sensed by the pyroelectric sensor 56.

The electrical terminals 108, 110 are electrically coupled to the electrodes 104, 106, respectively and are provided to apply a voltage to the electrodes 104, 106. In one exemplary embodiment, me electrical terminal 108 is electrically coupled to the node 70 and the terminal 110 is electrically coupled to the node 72.

The heat absorbing layer 112 is provided to absorb heat energy from visible light and infrared light reflected from a portion of a scene of an environment onto the heat absorbing layer 112. The heat absorbing layer 112 is disposed over the electrodes 104 and 106 and portions of the ferroelectric layer 102 not covered by the electrodes 104 and 106. In one non-limiting exemplary embodiment, heat absorbing layer 112 comprises silicon dioxide with a thin layer of platinum wherein the heat absorbing layer is tuned to allow radiation or light of interest therethrough. Of course, other materials comprising heat absorbing layer 112 are considered to be within the scope of exemplary embodiments of the present invention. Non-limiting examples of desirable wavebands are 3-5 microns and 8-12 microns. Of course, wavebands greater or less than the aforementioned ranges are considered to be within the scope of exemplary embodiments of the present invention.

In accordance with an exemplary embodiment the pyroelectric sensor is constructed to have a planar configuration providing a lower profile than sensors with electrodes stacked upon each other. In one non-limiting exemplary embodiment, insulation layer 100 and ferroelectric layer 102 are planar members and electrodes 104 and 106 are disposed upon the side of the ferroelectric layer opposite the insulation layer using lithographic fabrication techniques, lithography, silk screening or equivalents thereof resulting in a substantially low profile. Thereafter, heat absorbing layer 112 is disposed upon electrodes 104 and 106.

In accordance with exemplary embodiments of the present invention other types of pyroelectric sensors may be employed in the focal plane array of the universal analyzer. For example, other non-limiting examples are found in U.S. patent application Ser. No. 11/319,033; U.S. patent application Ser. No. 11/353,355; and U.S. Pat. No. 6,339,221 the contents of which are incorporated herein by reference thereto.

Figure 3:
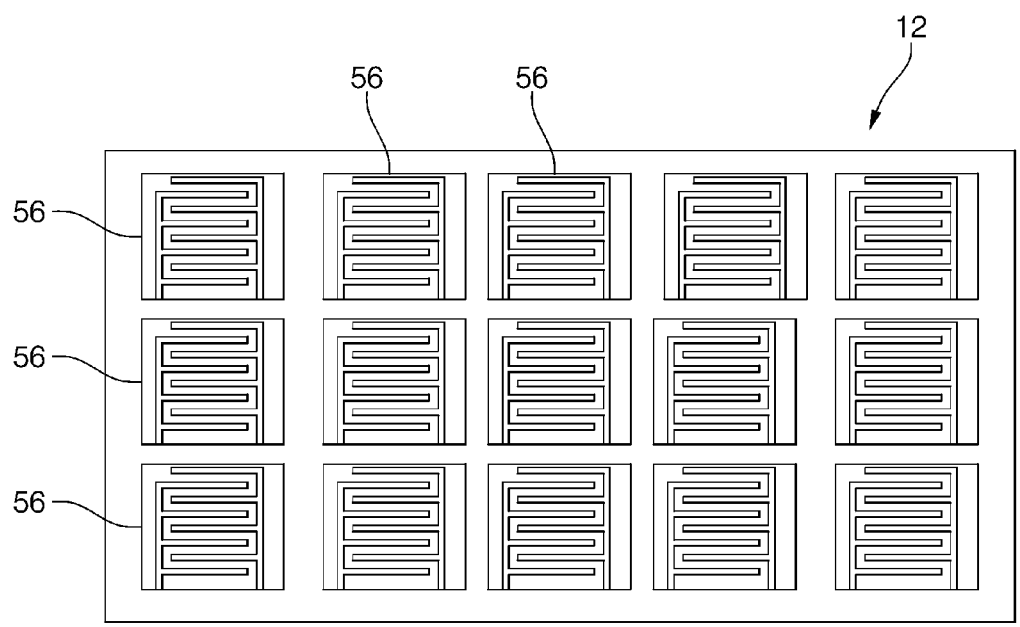
FIG. 3 is a top view of the focal plane array for use in exemplary embodiments of the present invention.

Referring now to FIGS. 2 and 3, a general overview of the operation of the system of the focal plane array in accordance with one non-limiting example will now be provided. When the voltage source transmits an oscillatory voltage waveform 90 to the pyroelectric sensors 56, 58, the pyroelectric sensors 56, 58 switch between a first polarization state and a second polarization state. Each time the pyroelectric sensors 56, 58 switch from an unpoled state, an electrical charge $Q_{s1}$ is applied from the voltage source to the pyroelectric sensor 56. The electrical charge $Q_{s1}$ can be calculated using the following equation:

$$Q_{s1} = A1 * P_{s1}$$

where;

A1 is the area of the pyroelectric sensor 56;

$P_{s1}$ is a change in spontaneous polarization per unit volume of the pyroelectric sensor 56 due to a temperature change $\Delta T_{p1}$. If the positive or negative electrical charge of the pyroelectric sensor 56 is integrated over a predetermined time period, the total charge accumulated for a predetermined number of cycles N1 of the voltage waveform 90, can be calculated utilizing the following equation:

$$Q_{Total1} = N1 * Q_{s1} = N1 * A1 * P_{s1}$$

Further, the total charge $Q_{Total1}$ is indicative of an electrical current level flowing through the pyroelectric sensor 56, which is further indicative of the temperature of the pyroelectric sensor 56, which is further indicative of a temperature of portion of a scene being monitored by the pyroelectric sensor 56.

The electric circuit generates a signal $V_{Diff1}$ on the node 82 in response to the voltage waveform 90 corresponding to a difference between the $Q_{Total1}$ electrical charge of the pyroelectric sensor 56 and the $Q_{Reference1}$ electrical charge of the pyroelectric sensor 58. The operational amplifier in conjunction with the capacitor integrates the signal $V_{Diff1}$ over a predetermined time period to generate the signal $V_{Int1}$, that is indicative of an average temperature of the pyroelectric sensor 56.

Referring again to FIG. 2, the image processor receives the voltage signal $V_{Int1}$ from the electrical circuit and generates image data based on the signal.

The system has been described above having electrical circuit for controlling pyroelectric sensor 56 for purposes of simplicity. It should be noted, however, that a plurality of additional electrical circuits having a substantially similar structure as circuit 12 would be utilized for controlling additional pyroelectric sensors receiving infrared light in the focal plane array. Of course, voltage sources for each of the pyroelectric sensors could vary the number of cycles of a voltage waveform applied to the pyroelectric sensors to adjust the corresponding signal-to-noise ratios and sensitivities.

Referring now back to FIG. 1, the focal plane array system as described in FIGS. 2-5 and equivalents thereof, will provide a signature 22. Again the signature corresponding to a specific set of wavelengths is filtered by a tunable optical filter. Thereafter, the signature is compared to a signature selected from database of signatures for comparison to see if the analyzer has detected a match.

Figure 7:
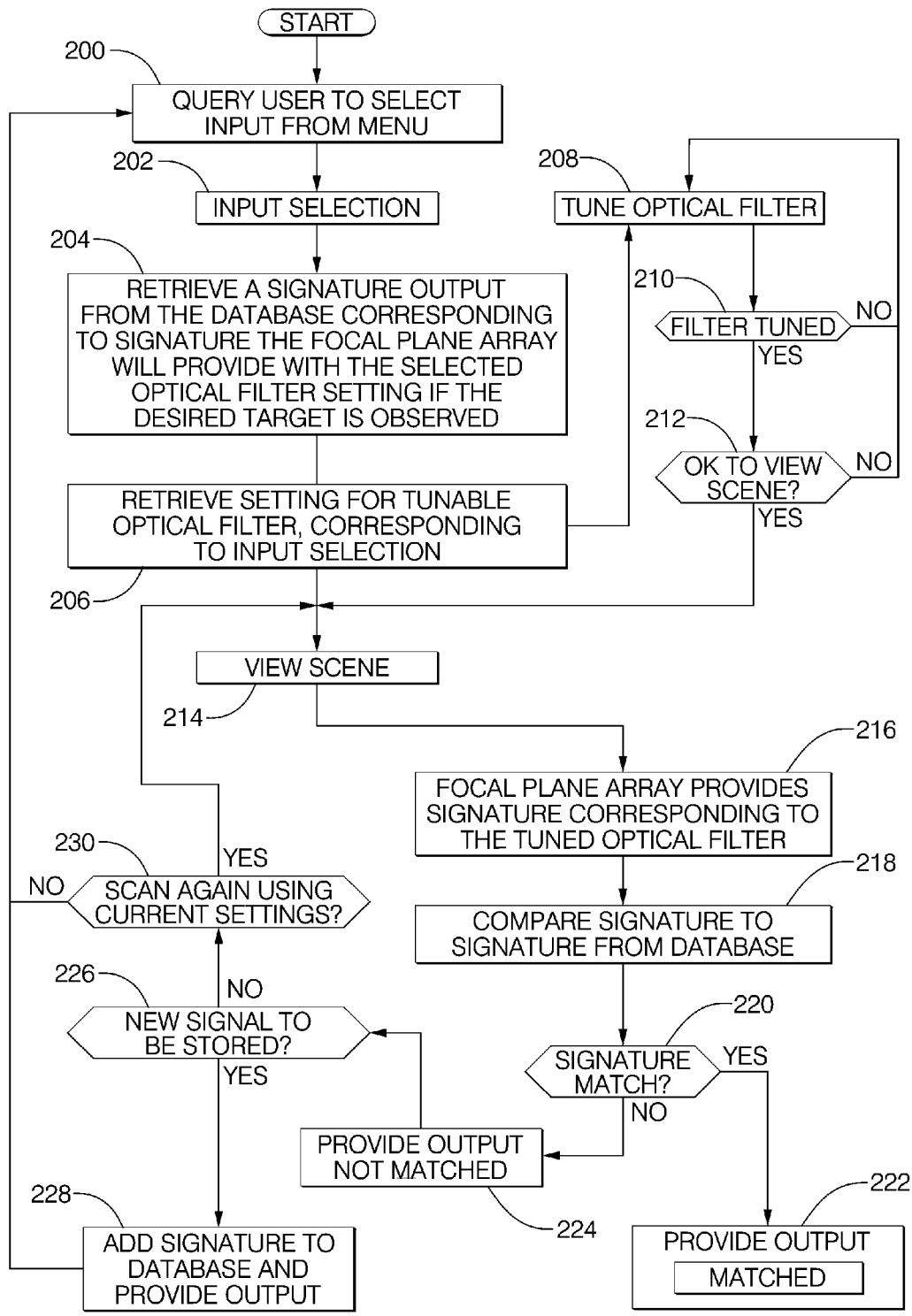
FIG. 7 is a flowchart illustrating a method of an exemplary embodiment of the present invention.

Referring now to FIG. 7, a method for providing and/or operating a universal infrared analyzer in accordance with one exemplary embodiment will now be explained. FIG. 7 illustrates a flow chart of an algorithm resident upon a microprocessor of a universal analyzer constructed in accordance with an exemplary embodiment of the present invention. At step 200, an operating system of the universal analyzer will query a user to select an input from a menu. The menu will comprise a means for selecting a function specific setting wherein a function specific signature corresponding to the function specific setting will be selected as the specific signature or image to be identified as well as configuring the universal analyzer to indicate when the specific signature has been viewed or identified by the universal analyzer. The input selection (e.g., function specific setting) is represented by box 202. After the selection of the function specific setting the operating algorithm of the universal analyzer will retrieve a signature or image output from a database containing a plurality of signatures indicative of signatures or images that will be provided by the focal plane array should the desired scene (e.g., function specific setting) be detected by the universal analyzer. This step is represented by box 204.

In addition, and based upon the input selection provided at box 202, a control algorithm of the operating system of the universal analyzer will also select one of a plurality stored function specific settings, which will tune the tunable optical filter, via the controller, to only allow radiation of specific wavelengths to be received upon the focal plane array of the universal analyzer. This step is represented by box 206. This tuning will prevent or filter radiation that does not correspond to the desired signatures. Thereafter, and at step 208 optical filter is tuned by the controller of the universal analyzer.

A decision node 210 will determine whether the tunable optical filter has been tuned to allow the specifically selected wavelengths to pass through to the focal plane array. If so, an indicator will be provided to the user advising them that the universal analyzer is now ready to search for the desired signature (e.g., the one corresponding to the function specific setting). This step is illustrated by node 212, wherein the operator will be queried "Is it ok to view the scene?" Thereafter, and at box 214 an operator can direct the universal analyzer at a specimen or a scene and search for objects or situations wherein the universal analyzer will provide a signature corresponding to the desired input. This is represented by box 214. As noted herein and in accordance with an exemplary embodiment of the present invention the universal analyzer is a hand held device that operates in a passive mode, wherein no illumination of the scene is required.

Alter the universal analyzer has been directed towards an object, scene or location, the focal plane array will provide a signature corresponding to filtered radiation (e.g. passing through the tuned optical filter), which is illustrated by box 210. Thereafter, and at 218 a control algorithm of the universal analyzer will compare the signature generated by the focal plane array to a signature selected from the database, the selected signature corresponds to a signature that should be generated by the focal plane array if the same is directed towards an item corresponding to the selected user provided input.

Accordingly, and at decision node 220 the control algorithm will determine if there is a signature match. If so, an output 222 is provided with an indication of a signature match. Otherwise, an output 224 of no match is provided. Thereafter, a decision node 226 will query the user if this is a new signature that they would like to store in the database. If so, and as illustrated by step 228 the signature is added to the database. Accordingly, node 226 allows the control algorithm to query whether the unmatched signature is to be saved into the database of function specific signatures. Thus, unique signatures can be saved and stored for subsequent use.

In an alternative exemplary embodiment, node 226 and step 228 are removed.

Thereafter, a decision node 230 will query the user if they would like to analyze or scan another area or the same area with the same settings or alternatively query the user to select another input from the menu.

Figure 8:
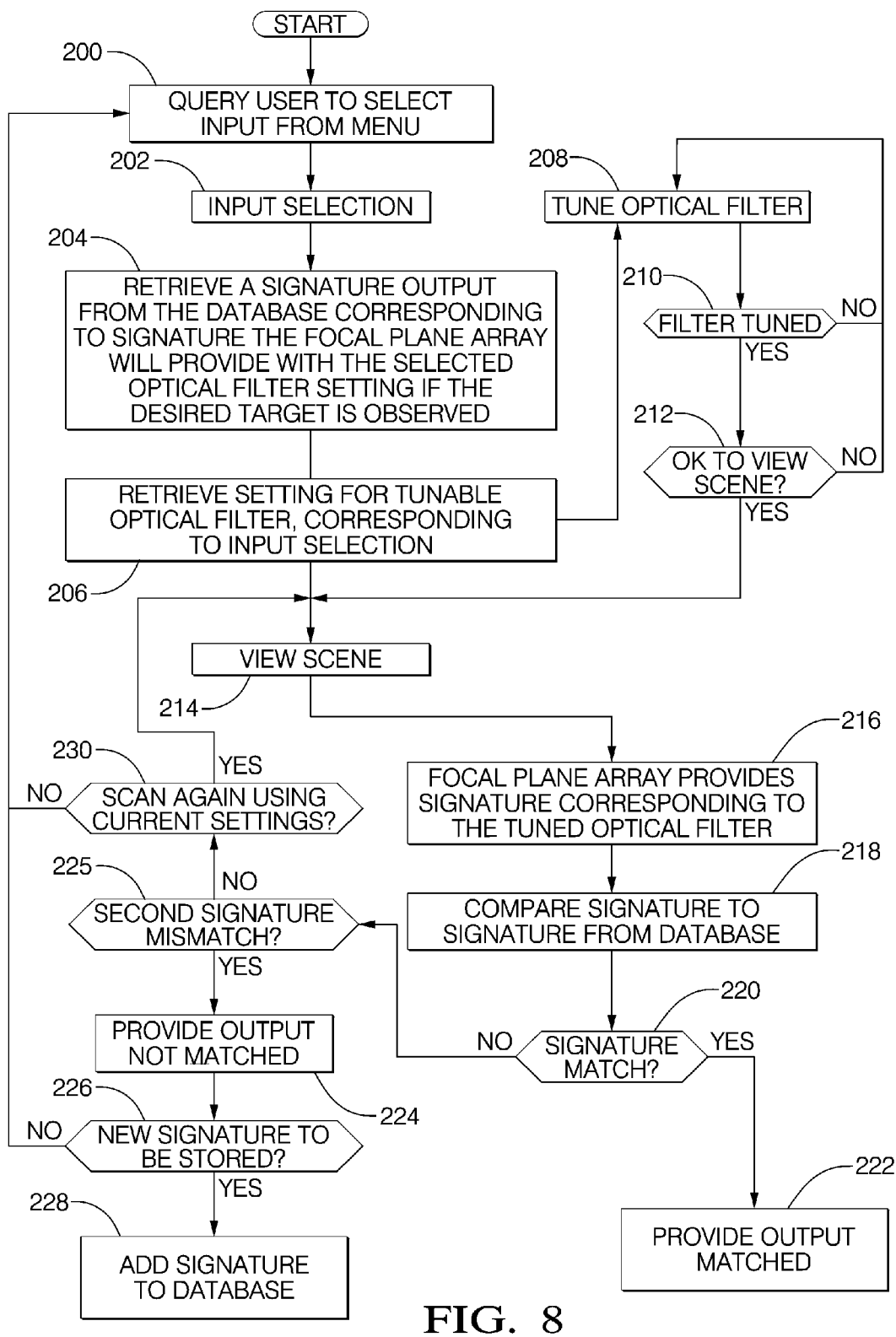
FIG. 8 is a flowchart illustrating an alternative exemplary embodiment of the present invention.

Referring now to FIG. 8, another alternative exemplary embodiment of the present invention is illustrated. FIG. 8 illustrates a flow chart of an alternative algorithm resident upon a microprocessor of a universal analyzer constructed in accordance with an exemplary embodiment of the present invention. Here and if decision node 220 determines that these is no signature match, a decision node 225 will query if this is the second attempt to provide a match by viewing a scene. If so, an output 224 of "no match" is provided. Thereafter, a decision node 226 will query the user if this is a new signature that they would like to store in the database. If so, and as illustrated by step 228 the signature is added to the database. Once again, and in an alternative exemplary embodiment, node 226 and step 228 are removed.

Thereafter, decision node 230 will query the user if they would like to analyze or scan another area or the same area with the same settings or alternatively query the user to select another input from the menu. In essence, the algorithm of FIG. 8 provides an operating system wherein the algorithm will view a scene twice in an attempt to match the viewed scene with the signature of the selected function specific setting. Of course, other configurations (e.g., number of scene viewings greater than two) of the algorithm are contemplated to be within the scope of exemplary embodiments of the present invention.

Figure 11:
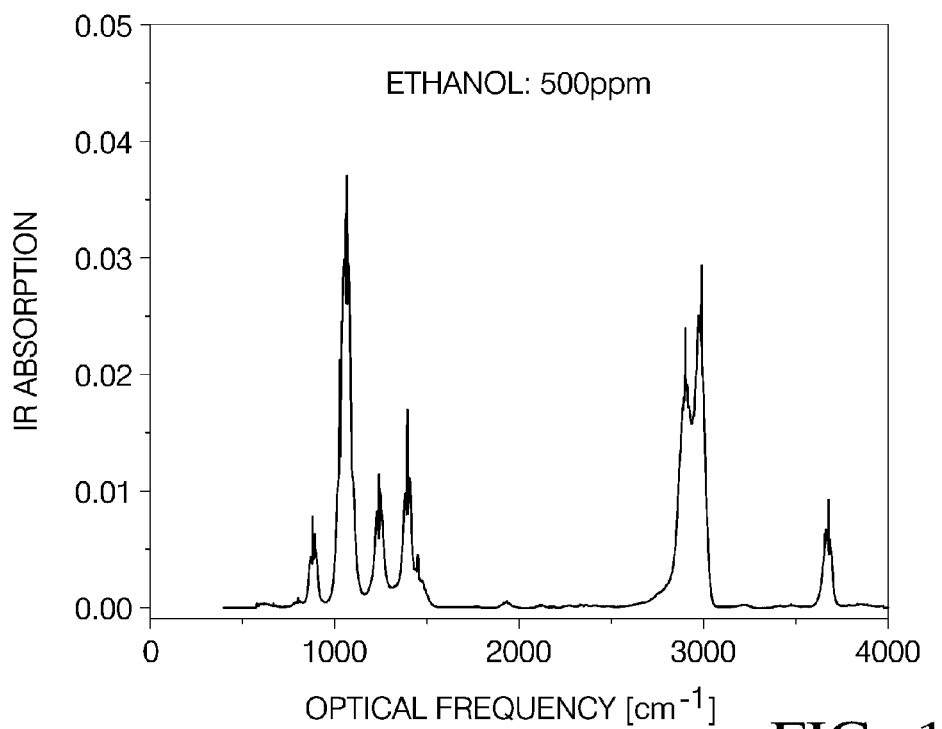
FIGS. 11A and 11B illustrates infrared adsorption signatures for specific gases, liquids and/or compositions.
Figure 11:
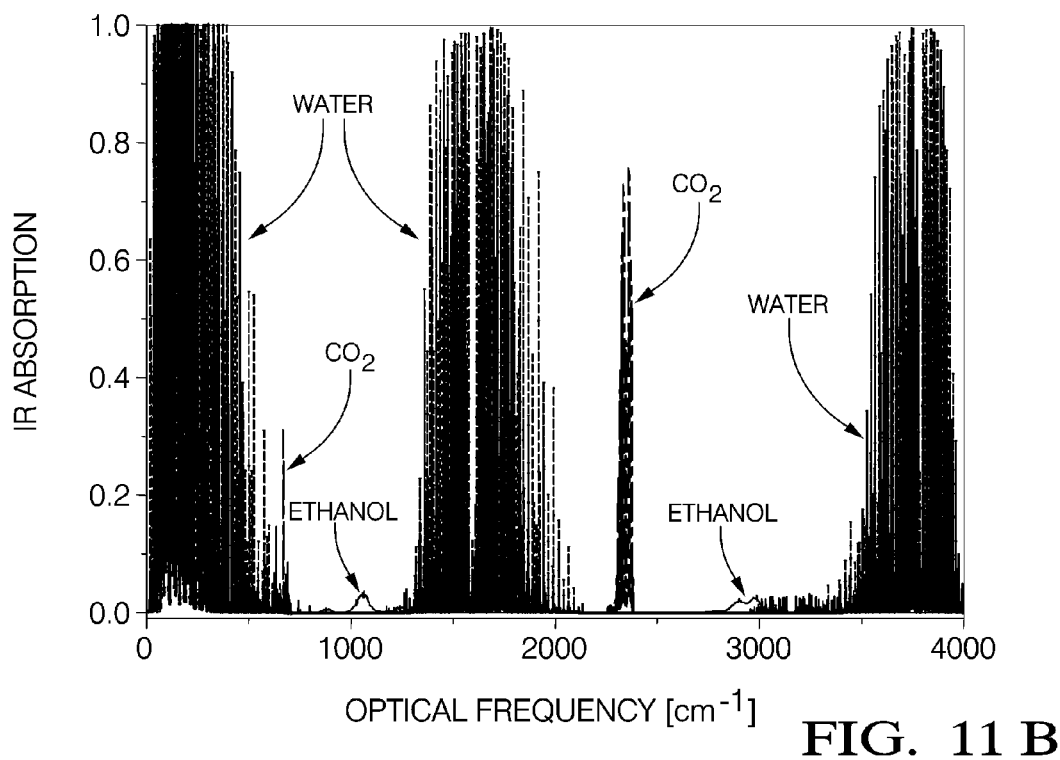

Depending upon the application, one or more of the following signature types may be used: thermal imaging to recognize different levels of temperature over a desirable range of temperatures, application dependent temperature ranges; identification of extreme temperature values; absorption or reflection spectroscopy imaging that is calibrated for specific wavelength ranges that are indicative of specific materials (including gases) and/or material composition; fusion imaging including the conversion of non-visible portions of the spectrum onto the visible spectrum (vision enhancement or night vision); differential imaging (vision enhancement such as vision through fog and/or subtraction of visible light from non-visible light); and wavelength dependent imaging to recognize gases and solids based on complex material signatures (See the graphs of FIGS. 11A-11B).

Figure 9:
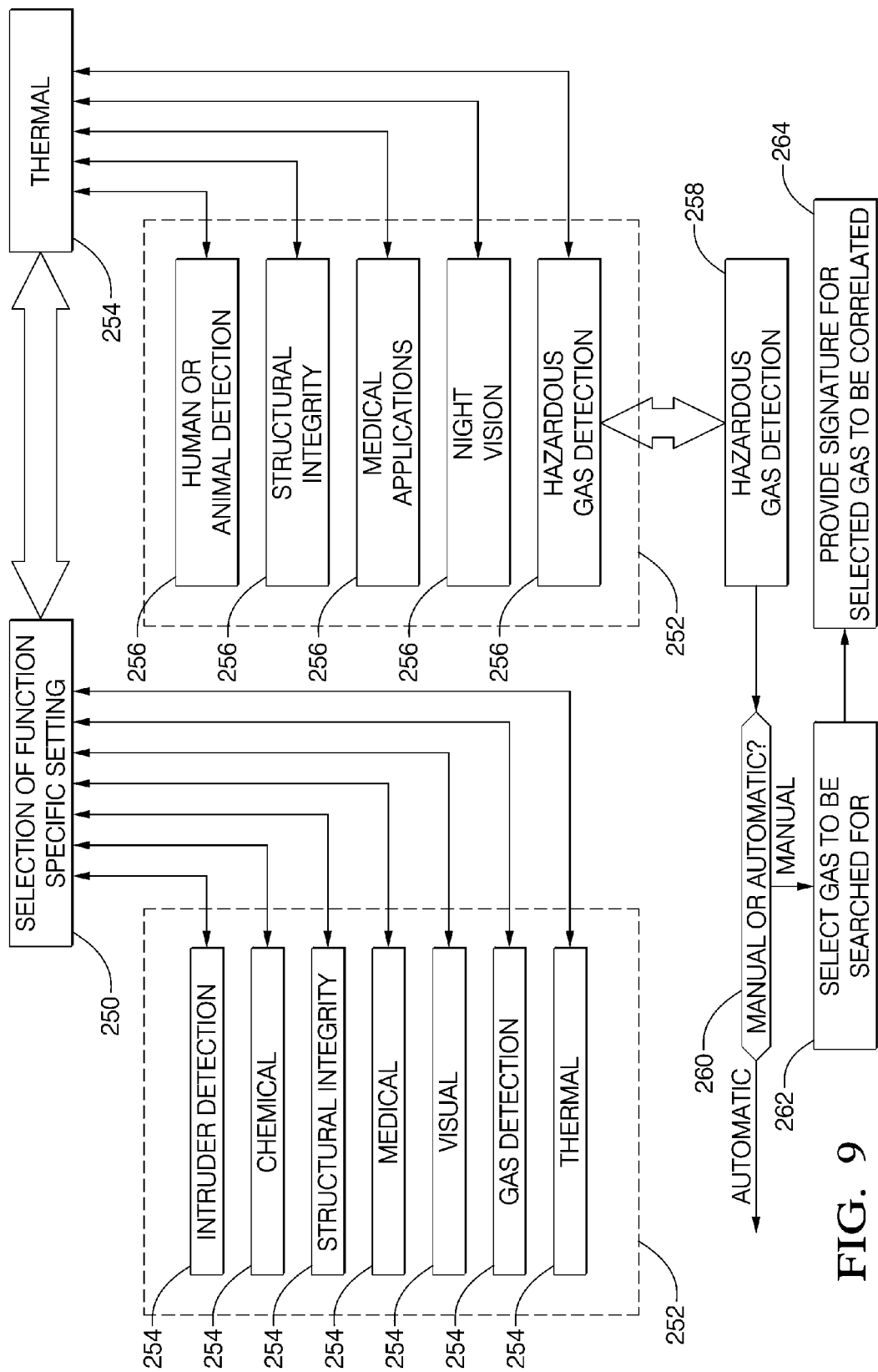
FIGS. 9 and 10 illustrate one non-limiting example of function specific settings and stored specific signatures and usage of the same in accordance with an exemplary embodiment of the present invention.

For example, and referring now to FIG. 9, a non-limiting example of the selection of the function specific settings and retrieval of the corresponding function specific signatures is illustrated. Here box 250 represents the selection of the function specific setting of the universal analyzer by the user input (e.g., function selection—box 26 in FIG. 1 and box 202 in FIGS. 7 and 8). As illustrated a database 252 of a plurality of function specific settings 254 use selectable through the user input. In the illustrated example, the "Thermal" function specific setting has been selected. Here database 252 will further comprise a plurality of sub-function specific settings 256 corresponding to the "Thermal" selection, which are also selectable through the user input.

In the illustrated example, the "Hazardous gas detection" sub-function specific setting has been selected. This is illustrated by box 258. Once again, the database will further comprise a plurality of sub settings corresponding to the "hazardous gas detection selection" (e.g., $CO_2$).

In accordance with an exemplary embodiment of the present invention, the algorithm is equipped to have a manual or automatic mode. A decision node 260 will query the user if they would like to use a manual or automatic mode. If manual is selected, box 262 represents the selection of the gas to be searched for and the corresponding signature is provided box 26, which corresponds to step 204 in FIGS. 7 and 8 and thereafter the system operates using the algorithms depicted in FIGS. 7 and/or 8.

Figure 10:
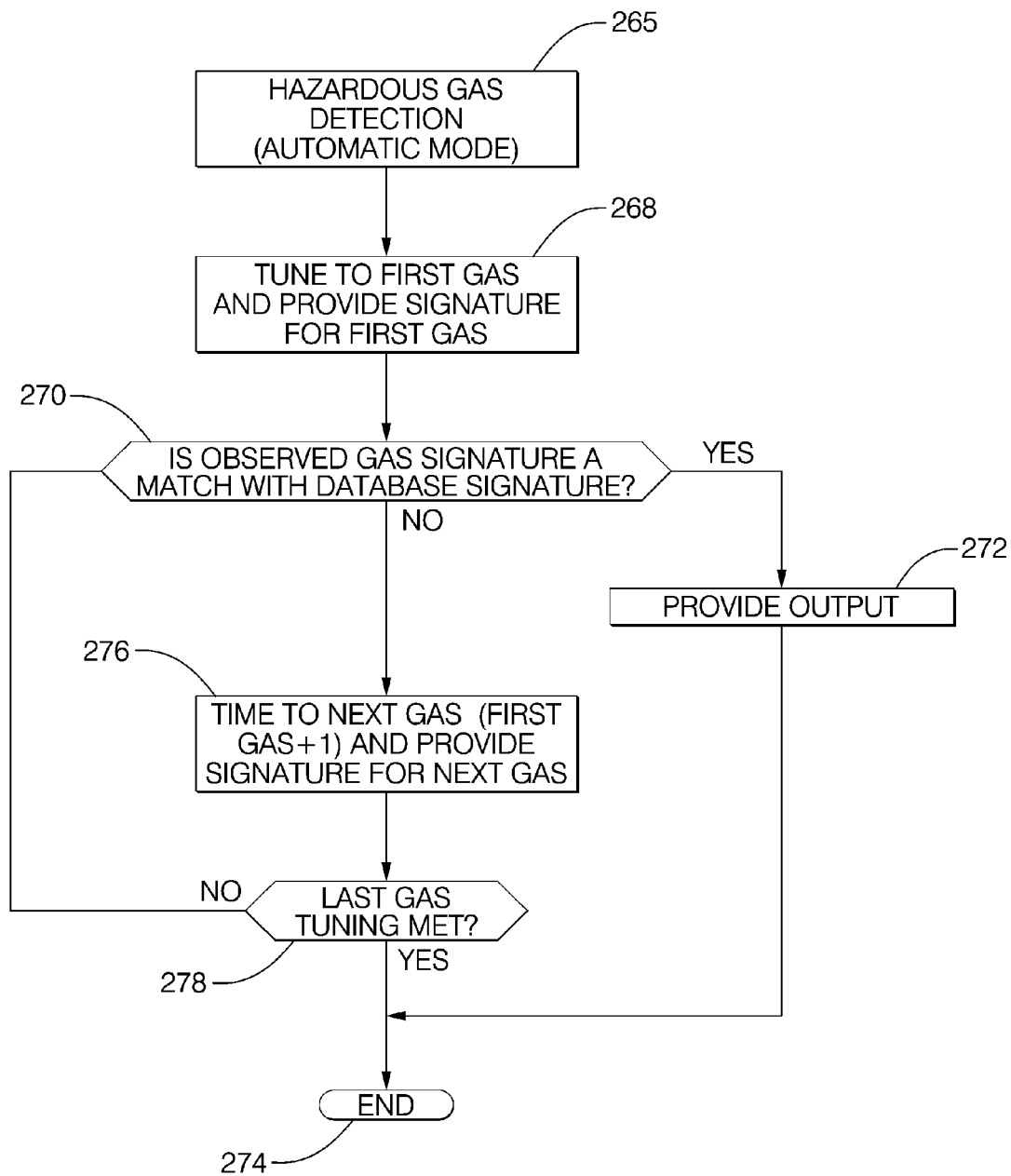

Alternatively, and if the automatic mode is selected the system will automatically compare the detected signature to each of the function specific signatures of the corresponding function specific settings and function specific sub-settings. FIG. 10 illustrates one non-limiting exemplary embodiment of a control algorithm for an automatic mode. Once again, the hazardous gas selection example is used, of course, any of the function specific setting may be used here.

As illustrated at step 268 the filter is tuned to the first gas of the plurality of signatures stored in the database. In this embodiment each of the signatures and their corresponding filter settings will be categorized numerically or with any other equivalent identifier suitable for use in a control algorithm. Accordingly, step 208 is able to grab or retrieve the data in the databases, which, corresponds to the settings and signatures for the first gas in the automatic mode and thus, the data is used to tune the filter and provide a reference point for comparison to the detected signature. Thereafter, node 270 determines if there is a match with the viewed scene. If so, an output 272 is provided and the automatic mode terminates at box 274. If on the other hand there is no match, the filter is tuned (if necessary) to the next gas and the signature of the next gas is provided. This is represented by box 276. As used herein the term "next gas" is intended to include the next numerical or equivalent identifier of the signatures and settings of the gases in the database. Thereafter, a node 278 will determine if the last used signature and corresponding settings were those of the last gas in the database (e.g., the last of a list of signatures and settings corresponding to a database of gases). If so, the automatic mode terminates at box 274. If on the other hand there are more signatures and settings to be used, the filter is tuned (if necessary) to the next gas and the signature of the next gas is provided. This is represented by box 276 and node 270 determines if there is a match. In yet another alternative and if applicable, the automatic mode may tune the filter to allow all wavelengths corresponding to all desired signatures to pass through to the focal plane array. In this embodiment a scene is viewed once and the signature is stored for comparison to each of the stored signatures in the database. In other words, the scene is viewed once and the signature is stored and compared to each of the signatures in the corresponding database. Alternatively, the scene is viewed each time the automatic mode cycles to the next signature.

FIGS. 11A and 11B provides non-limiting examples of some of the function specific settings and corresponding IR absorption signatures that can be retrieved from the database for comparison to signatures obtained from field data to determine if there is a match.

Referring now to FIG. 6, a graph illustrating the percentage of transmission of radiation wavelengths through a Fabry-Perot interferomtric filter is provided. A Fabry-Perot interferomtric filter is but one of various tunable optical filters that can be implemented with the universal analyzer of exemplary embodiment of the present invention. As shown in FIG. 6, the transmission percentage and wavelength changes as the driving voltage varies. For example, and as shown in FIG. 6, each of the traces from left to right corresponds to driving voltages of 0 Volts, 5 Volts, 7 Volts, 0 Volts, 10 Volts, 11 Volts, 12 Volts, 13 Volts, 13.5 Volts, 14 Volts, 14.2 Volts. FIG. 6 is reproduced from S. Kurth et al. "Tunable Fabry Perot Filter for 3-4.5 µm Wavelength with Balk Micromachined Reflective Carrier," http://www.zfm.tuchemnitz.de/tu/pdf/annual_report_2002/special_report_11.pdf.

Figure 12:
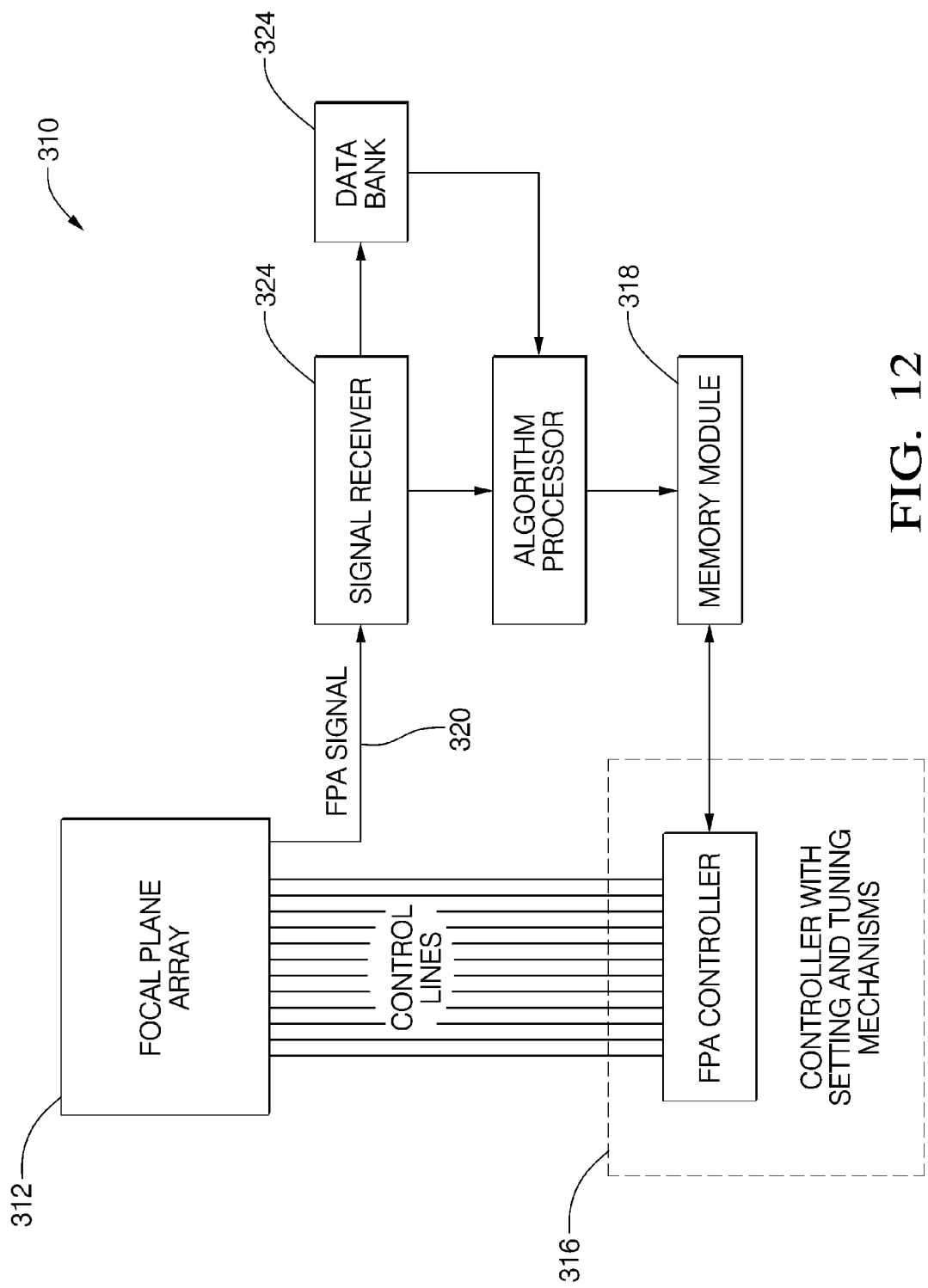
FIG. 12 is a schematic illustration of an alternative exemplary embodiment of the present invention.

Referring now to FIG. 12 an alternative exemplary of the present invention is illustrated. In this embodiment, a universal analyzer 310 is illustrated. Here universal analyzer 310 comprises a focal plane array 312, which is positioned behind a tunable optical filter (not shown). In this embodiment, the controller comprising the necessary setting and tuning mechanisms for the tunable optical filter and the focal plane array is illustrated as box 316. The controller is, of course, in electrical communication with the focal plane array and the tunable optical filter as well as a memory module 318 which comprises a storage medium for containing the databases comprising the function specific settings for the tunable optical filter. Thereafter, and after the focal array has been directed towards a desired area a signal 320 will be generated and received by a signal receiver 322. Signal receiver 322 comprises the necessary electrical components (e.g., amplifiers, filters etc.) to provide a signal that is comparable to a signature or signal stored in a data bank or database 324, wherein the processor of an exemplary embodiment will take the signature from the focal plane array and compare it to a corresponding signature provided from the data bank in order to provide an indication to the user whether the selected signature has been viewed by the universal analyzer.

In accordance with yet another exemplary embodiment, the plurality of signatures stored in the universal analyzer are compiled by the universal analyzer itself. In this embodiment, the universal analyzer has a scan and save option in addition to the scan and compare function as previously described. In this function, the universal analyzer is configured to scan a scene with a specific setting of the tunable optical filter thereafter and if desired, the signature of the scanned scene is stored as a signature for comparison in other applications of exemplary embodiments of the present invention.

While embodiments of the invention are described with reference to the exemplary embodiments, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited to the embodiment disclosed for carrying out this invention, but that the invention includes all embodiments falling within the scope of the intended claims. Moreover, the use of the term's first, second, etc. does not denote any order of importance, but rather the term's first, second, etc. are used to distinguish one element from another. Furthermore, the use of the terms a, an, etc. do not denote a limitation of quantity, but rather denote the presence of at least one of the referenced items.

What is claimed is:

1. A universal infrared analyzer, comprising:
   a focal plane array;
   a tunable optical filter positioned proximate to the focal plane array, wherein the tunable optical filter is capable of being tuned to one of a selectable set of wavelengths of radiation;
   a controller in operable communication with the focal plane array and the tunable optical filter;
   a database of a plurality of function specific settings in operable communication with the controller, wherein the plurality of function specific settings includes settings for at least one of the functions from the group consisting of intruder detection, chemical detection, structural integrity detection, medical applications detection, and gas detection, wherein each of the plurality of function specific settings provides data to the controller to tune the tunable optical filter to one of the selectable sets of wavelengths;
   a database of a plurality of function specific signatures in operable communication with the controller;
   a user input interface, for manually selecting one of the plurality of function specific settings and one of the plurality of function specific signatures, wherein the user input interface comprises one from the group consisting of keyboards, liquid crystal displays, touch screens, and mouse, wherein the controller tunes the tunable optical filter to one of the selectable set of wavelengths of radiation based upon the selected one of the function specific settings and the focal plane array generates a signature based upon a target detected by the focal plane array;
   a correlator for comparing the signature to the selected one of the plurality of function specific signatures, wherein the selected function specific signatures corresponds to the selected function specific setting and the correlator is in operable communication with the focal plane array and the database of the plurality of function specific signatures, wherein the correlator provides an output indicating whether the signature corresponds to the selected one of the plurality of function specific signatures; and
   wherein the universal infrared analyzer does not provide a source of illumination to the target.

2. The universal infrared analyzer as in claim 1, wherein the plurality of function specific signatures include at least one of thermal signatures, temperature signatures, gas signatures, vapor signatures, chemical signatures and combinations thereof and the universal analyzer is a hand held device.

3. The universal infrared analyzer as in claim 2, wherein the universal analyzer comprises a housing that is configured to be easily grasped and used by an individual.

4. The universal infrared analyzer as in claim 2, wherein the selectable set of wavelengths of radiation is in a range defined by 0.3-16 µm.

5. The universal infrared analyzer as in claim 4, wherein each of the function specific settings further comprises a plurality of sub-function specific settings wherein each of the plurality of sub-function specific settings provides data to the controller to tune the tunable optical filter to one of the selectable sets of wavelengths of radiation and each of the plurality of sub-function specific settings has a corresponding function specific signature in the database of the plurality of function specific signatures and each corresponding function specific signature is selected for comparison to the signature when one of the plurality of sub-function specific settings is selected, wherein the universal infrared analyzer further comprises an automatic mode for comparing each of the corresponding function specific signatures of the plurality of sub-function specific settings of a function specific setting to the signature when a function specific setting is selected by the user input interface.

6. The universal infrared analyzer as in claim 1, wherein the plurality of function specific signatures include at least one of thermal signatures, temperature signatures, gas signatures, vapor signatures, chemical signatures and combinations thereof and each of the function specific settings further comprises a plurality of sub-function specific settings wherein each of the plurality of sub-function specific settings provides data to the controller to tune the tunable optical filter to one of the selectable sets of wavelengths of radiation and each of the plurality of sub-function specific settings has a corresponding function specific signature in the database of the plurality of function specific signatures and each corresponding function specific signature is selected for comparison to the signature when one of the plurality of sub-function specific settings is selected, wherein the universal infrared analyzer further comprises an automatic mode for comparing each of the corresponding function specific signatures of the plurality of sub-function specific settings of a function specific setting to the signature when a function specific setting is selected by the user input interface and the universal infrared analyzer further comprises a manual mode for saving the signature to the database when none of the plurality of function specific signatures matches the signature, wherein the signature is compared to at least one of the plurality of function specific signatures twice and the saved signature is available for comparison as one of the plurality of function specific signatures.

7. The universal infrared analyzer as in claim 1, wherein the plurality of function specific settings include visible and non-visible radiation and the universal analyzer is a hand held device.

8. The universal infrared analyzer as in claim 1, wherein the selectable set of wavelengths of radiation is in a range defined by 0.3-16 µm.

9. The universal infrared analyzer as in claim 1, wherein the tunable optical filter is a Fabry-Perot Interferometric filter and the universal infrared analyzer has a manual mode for saving the signature to the database of the plurality of function specific signatures when none of the plurality of function specific signatures matches the signature, wherein the signature is compared to at least one of the plurality of function specific signatures twice and the saved signature is available for comparison as one of the plurality of function specific signatures.

10. The universal infrared analyzer as in claim 1, wherein the focal plane array comprises a plurality of pyroelectric sensors and each of the function specific settings further comprises a plurality of sub-function specific settings wherein each of the plurality of sub-function specific settings provides data to the controller to tune the tunable optical filter to one of the selectable sets of wavelengths of radiation and each of the plurality of sub-function specific settings has a corresponding function specific signature in the database of the plurality of function specific signatures and each corresponding function specific signature is selected for comparison to the signature when one of the plurality of sub-function specific settings is selected, wherein the universal infrared analyzer has an automatic mode for comparing each of the corresponding function specific signatures of the plurality of sub-function specific settings of a function specific setting to the signature when a function specific setting is selected by the user input interface.

11. The universal infrared analyzer as in claim 1, wherein the universal infrared analyzer further comprises a manual mode for saving the signature to the database of the plurality of function specific signatures when none of the plurality of function specific signatures matches the signature and the saved signature is available for comparison as one of the plurality of function specific signatures.

12. A universal infrared analyzer, comprising:
a focal plane array;
a tunable optical filter positioned proximate to the focal plane array, wherein the tunable optical filter is capable of being tuned to one of a selectable set of wavelengths of radiation, the selectable set of wavelengths of radiation being in a range defined by 0.3-16 μm;
a controller in operable communication with the focal plane array and the tunable optical filter;
a database of a plurality of function specific settings in operable communication with the controller, wherein the plurality of function specific settings includes settings for at least one of the functions from the group consisting of intruder detection, chemical detection, structural integrity detection, medical applications detection, and gas detection, wherein each of the plurality of function specific settings provides data to the controller to tune the tunable optical filter to one of the selectable sets of wavelengths;
a database of a plurality of function specific signatures in operable communication with the controller;
a user input interface, for manually selecting one of the plurality of function specific settings and one of the plurality of function specific signatures, wherein the user input interface comprises one from the group consisting of keyboards, liquid crystal displays, touch screens, and mouse, wherein the controller tunes the tunable optical filter to one of the selectable set of wavelengths of radiation based upon the selected one of the function specific settings and the focal plane array generates a signature based upon a target detected by the focal plane array; and
a correlator for comparing the signature to the selected one of the plurality of function specific signatures, wherein the correlator provides an output indicating whether the signature corresponds to the selected one of the plurality of function specific signatures.

13. The universal infrared analyzer as in claim 12, wherein the plurality of function specific signatures include at least one of thermal signatures, temperature signatures, gas signatures, vapor signatures, chemical signatures and combinations thereof and the universal analyzer is a hand held device.

14. The universal infrared analyzer as in claim 13, wherein each of the function specific settings further comprises a plurality of sub-function specific settings wherein each of the plurality of sub-function specific settings provides data to the controller to tune the tunable optical filter to one of the selectable sets of wavelengths of radiation and each of the plurality of sub-function specific settings has a corresponding function specific signature in the database of the plurality of function specific signatures and each corresponding function specific signature is selected for comparison to the signature when one of the plurality of sub-function specific settings is selected, wherein the universal infrared analyzer further comprises an automatic mode for comparing each of the corresponding function specific signatures of the plurality of sub-function specific settings of a function specific setting to the signature when a function specific setting is selected by the user input interface.

15. The universal infrared analyzer as in claim 12, wherein the universal infrared analyzer has an automatic mode for comparing each of a set of the plurality of function specific signatures to the signature and the universal analyzer is a hand held device.

16. The universal infrared analyzer as in claim 12, wherein each of the function specific settings further comprises a plurality of sub-function specific settings wherein each of the plurality of sub-function specific settings provides data to the controller to tune the tunable optical filter to one of the selectable sets of wavelengths of radiation and each of the plurality of sub-function specific settings has a corresponding function specific signature in the database of the plurality of function specific signatures and each corresponding function specific signature is selected for comparison to the signature when one of the plurality of sub-function specific settings is selected, wherein the universal infrared analyzer further comprises an automatic mode for comparing each of the corresponding function specific signatures of the plurality of sub-function specific settings of a function specific setting to the signature when a function specific setting is selected by the user input interface and the universal infrared analyzer further comprises a manual mode for saving the signature to the database when none of the plurality of function specific signatures matches the signature, wherein the signature is compared to at least one of the plurality of function specific signatures twice and the saved signature is available for comparison as one of the plurality of function specific signatures.

17. The universal infrared analyzer as in claim 12, wherein the universal infrared analyzer further comprises a manual mode for saving the signature to the database of the plurality of function specific signatures when none of the plurality of function specific signatures matches the signature and the saved signature is available for comparison as one of the plurality of function specific signatures.

18. The universal infrared analyzer as in claim 12, wherein each of the function specific settings further comprises a plurality of sub-function specific settings wherein each of the plurality of sub-function specific settings provides data to the controller to tune the tunable optical filter to one of the selectable sets of wavelengths of radiation and each of the plurality of sub-function specific settings has a corresponding function specific signature in the database of the plurality of function specific signatures and each corresponding function specific signature is selected for comparison to the signature when one of the plurality of sub-function specific settings is selected, wherein the universal infrared analyzer further comprises an automatic mode for comparing each of the corresponding function specific signatures of the plurality of sub-function specific settings of a function specific setting to the signature when a function specific setting is selected by the user input interface.

19. The universal infrared analyzer as in claim 12, wherein the focal plane array comprises a plurality of pyroelectric sensors and the database of the plurality function specific signatures includes signatures previously detected and saved by the universal analyzer.

20. A method for detecting a desired signature with a universal infrared analyzer, the method comprising:
providing a database of a plurality of function specific settings, wherein the plurality of function specific settings includes settings for at least one of the functions from the group consisting of intruder detection, chemical detection, structural integrity detection, medical applications detection, and gas detection, each of the plurality of function specific settings defining a setting of a tunable optical filter being proximate to a focal plane array of the universal infrared analyzer, the setting of the tunable optical filter corresponding to one of a selectable set of wavelengths of radiation, the selectable set of wavelengths of radiation being found in a range defined by 0.3-16 µm;
providing a database of a plurality function specific signatures, each of the plurality of function specific signatures corresponding to a signature generated detected by the focal plane array when a particular scene has been exposed to the focal plane array;
manually selecting one of the plurality of function specific settings using a user input interface, wherein the user input interface comprises one from the group consisting of keyboards, liquid crystal displays, touch screens, and mouse;
tuning the tunable optical filter to the selected one of the plurality of function specific settings;
selecting one of the plurality of function specific signatures;
exposing the focal plane array to a scene wherein radiation is passed through the tunable optical filter to the focal plane array;
generating a signature from the focal plane array, the signature corresponding to radiation detected from the scene, the radiation being one of a selectable set of wavelengths of radiation corresponding to the selected one of the plurality of function specific settings;
comparing the generated signature to the selected one of the plurality function specific signatures; and
indicating whether the generated signature is similar to the selected one of the plurality function specific signatures.

21. The method as in claim 20, wherein each of the function specific settings further comprises a plurality of sub-function specific settings wherein each of the plurality of sub-function specific settings provides data to the controller to tune the tunable optical filter to one of the selectable sets of wavelengths of radiation and each of the plurality of sub-function specific settings has a corresponding function specific signature in the database of the plurality of function specific signatures and each corresponding function specific signature is selected for comparison to the signature when one of the plurality of sub-function specific settings is selected, wherein the universal infrared analyzer further comprises an automatic mode for comparing each of the corresponding function specific signatures of the plurality of sub-function specific settings of a function specific setting to the signature when a function specific setting is selected by a user input interface.

22. The method as in claim 21, wherein the universal infrared analyzer further comprises a manual mode for saving the signature to the database when none of the plurality of function specific signatures matches the signature, wherein the signature is compared to at least one of the plurality of function specific signatures twice and the saved signature is available for comparison as one of the plurality of function specific signatures and the universal analyzer is a hand held device.

* * * * *